United States Patent [19]
Hoffmann et al.

[11] Patent Number: 5,830,597
[45] Date of Patent: Nov. 3, 1998

[54] METHOD AND EQUIPMENT FOR PRODUCING A PHOTOCHEMICAL CELL

[75] Inventors: Horst Hoffmann, Velbert; Anton Rodi, Leimen, both of Germany

[73] Assignee: Heidelberger Druckmaschinen AG, Heidelberg, Germany

[21] Appl. No.: 632,083

[22] Filed: Apr. 15, 1996

[30] Foreign Application Priority Data

Apr. 15, 1995 [DE] Germany .................. 195 14 156.3

[51] Int. Cl.⁶ .................................................. H01M 26/30
[52] U.S. Cl. ............................ 429/111; 427/74; 427/402
[58] Field of Search .................. 429/111; 427/74–75, 427/402, 419.2

[56] References Cited

U.S. PATENT DOCUMENTS 5,350,644 9/1994 Graetzel et al. ..................... 429/111

FOREIGN PATENT DOCUMENTS 0582212 2/1994 European Pat. Off. .
9116719 10/1991 WIPO .................................. 429/111

*Primary Examiner*—Nam Nguyen
*Attorney, Agent, or Firm*—Herbert L. Lerner; Laurence A. Greenberg

[57] ABSTRACT

Method for producing a photochemical cell having at least one carrier substrate and a plurality of layers disposed thereon includes performing a plurality of successive printing operations for applying the layers; a photochemical cell produced by the method; and equipment for performing the method.

15 Claims, 3 Drawing Sheets

METHOD AND EQUIPMENT FOR PRODUCING A PHOTOCHEMICAL CELL

BACKGROUND OF THE INVENTION

FILED OF THE INVENTION

The invention relates to a method and equipment for producing a photochemical cell, as well as to the photochemical cell per se, more particularly a dye solar cell having at least one carrier substrate and a plurality of layers disposed thereon.

Conventionally, the manufacture of such a photochemical cell has required complex specialized devices, a multiplicity of steps being performed manually. Such individual manufacture or production, which is performed in a laboratory, entails high unit costs and, moreover, is not reproducible.

Consequently, it is an object of the invention to provide a method and equipment for producing a photochemical cell which have a low cost and are reproducible. In particular, the method and equipment of the invention are intended to manufacture the dye solar cell developed by Prof. Michael Grätzel at the Ecole Politechnique Federale in Lausanne. Reference is made in this connection to the international patent application published under PCT, namely WO 91/16719.

SUMMARY OF THE INVENTION

With the foregoing and other objects in view, there is provided, in accordance with one aspect of the invention, a method for producing a photochemical cell having at least one carrier substrate and a plurality of layers disposed thereon, which comprises performing a plurality of successive printing operations for applying the layers.

In accordance with another mode of the invention, the method includes performing the printing operations while respectively forming a full-surface, coherent layer in the manner of an offset print.

In accordance with a further mode of the invention, the method includes performing the printing operations in direct succession.

In accordance with an added mode of the invention, the method includes applying each layer by a separate printing unit of a printing press.

In accordance with an additional mode of the invention, the method includes separating at least some of the layers into sections of individual cells by means of insulating webs.

In accordance with yet another mode of the invention, the method includes forming the insulating webs by printing.

In accordance with yet a further mode of the invention, the method includes applying a plurality of insulating-web layers for forming an insulating web bridging a plurality of the first-mentioned layers.

In accordance with yet an added mode of the invention, the method includes guiding the carrier substrate along a plane during the printing operation.

In accordance with yet an additional mode of the invention, the method includes supporting the carrier substrate on a plane during the printing operation.

In accordance with still another mode of the invention, the method includes printing the layers on the carrier substrate with a viscous medium.

In accordance with still a further mode of the invention, the method includes printing conductive layers on the carrier substrate for conducting electric current.

In accordance with still an added mode of the invention, the method includes forming conductive webs composed of conductive layers between the insulating webs.

In accordance with another aspect of the invention, there is provided a photochemical cell having at least one carrier substrate and comprising a plurality of layers disposed on the carrier substrate, the plurality of layers being formed as respective printings on top of one another by a plurality of successively performed printing operations.

In accordance with a further aspect of the invention, there is provided a method for operating a printing press with a plurality of printing units for producing a photochemical cell, which comprises printing successively with the plurality of printing units successive layers on a carrier substrate.

In accordance with an added aspect of the invention, there is provided a printing press for producing a photochemical cell having at least one carrier substrate and a plurality of layers disposed thereon, comprising a plurality of printing units for printing the layers on the carrier substrate, and provided with a flat supporting surface for the carrier substrate during the printing operation.

In accordance with another mode of the method according to the invention, the cell being produced is a dye solar cell.

In accordance with a further feature of the invention, the photochemical cell is a dye solar cell.

In accordance with a concomitant mode of the method of the invention, the printing press being operated is an offset printing press.

As noted hereinbefore, in accordance with the invention, the layers of the photochemical cell are applied by means of a plurality of successively performed printing operations. The use of printing technology for the application of the individual layers one on top of one another results, firstly, in a very close manufacturing tolerance and, secondly, in extremely low cost production, which permits mass production with very short production times. A complete dye solar cell can, in particular, be produced in one production sequence, it being possible for the necessarily very small layer thicknesses to be achieved with high precision. Particularly if production is performed by means of a rotary printing press, it is possible for very large-surface layers to be applied, particularly in a continuous manner, i.e., with theoretically no limit to the surface area. Thus, according to the invention, a printing press for the application of free structures is used for the production of the photochemical cell, it being possible to allow only extremely small tensile and compressive forces to act upon the layers, so that production is performed homogeneously and without crack damage or the like.

According to a further development of the invention, the printing operations are performed while respectively forming a full-surface, coherent layer produced in the manner of an offset print. The "manner of an offset print" means, with regard to "coherent" application that, unlike the printing of images, for example, it is not color dots which are created, but that a full-surface coating is performed. Nevertheless, all or most of the devices and apparatuses known from offset printing may also be used to produce the photochemical cell.

In particular, each layer is applied by means of a separate printing unit of a printing press. For this purpose, each printing unit is supplied with the corresponding material, which may differ from layer to layer. Preferably, the material is in the form of a viscous medium.

In order to separate the entire substrate into individual electric cells, at least some of the layers are divided by means of insulating webs into sections. Each section forms an individual cell which, for example, makes available a voltage of 1 volt.

The insulating webs are preferably likewise produced by means of a printing operation. If, in order to build up an insulating web bridging a plurality of layers, it is necessary for a corresponding web length to be formed, then preferably a plurality of insulating-web layers are applied, the number of printing operations resulting in the gradual build-up of the insulating web.

It is particularly preferred if, during the printing operation, the carrier substrate is guided along a plane or is supported on a plane. Guiding in a plane is required if the printing apparatus is location-fixed and the carrier substrate is moved. If the carrier substrate assumes a location-fixed position during the printing operation, it is necessary for the printing unit to be moved appropriately. Of course, relative movement is also possible wherein both parts execute a movement. Irrespective of the aforementioned variations, however, assurance must always be provided that the carrier substrate is not subjected to impermissible bending, because otherwise, damage to the layers may occur during the printing process, which may prevent satisfactory operation of the dye solar cell. Consequently, a departure from the conventional construction of printing presses is necessary so that the substrate to be printed is not transported in a curved manner through the printing press, but is held or guided in a flat manner during printing.

According to a further development of the invention, conductive layers for conducting electric current are printed. The conductive layers serve to collect and to carry away the charge carriers during the operation of the dye solar cell. The conductive layers may be used also to interconnect individual cells of an entire substrate, in order, for example, to create a series connection of the individual cells, it being possible, depending upon the construction, that conductive webs, extending between insulating webs, have to be formed. This may likewise be accomplished by means of one or more printing operations, wherein, in the case of a correspondingly large conductive web length, a plurality of conductive-layer sections are printed on top of one another, thereby producing the desired conductive web.

The invention relates further to a photochemical cell, more particularly a dye solar cell having at least one carrier substrate and a plurality of layers disposed thereon, the layers being produced on top of one another by means of a plurality of successively performed printing operations.

The invention further relates to a process for the use of a printing press, more particularly an offset printing press, with a plurality of printing units for the production or manufacture of a photochemical cell, more particularly a dye solar cell.

The invention also relates to a printing press, more particularly an offset printing press, for the production or manufacture of a photochemical cell, more particularly a dye solar cell, which is formed of at least one carrier substrate and a plurality of layers disposed thereon, a plurality of printing units being provided for printing the layers on top of one another, and a flat supporting surface being provided for the carrier substrate during the printing operation.

Other features which are considered as characteristic for the invention are set forth in the appended claims.

Although the invention is illustrated and described herein as embodied in a method and equipment for producing a photochemical cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DETAILED DESCRIPTION OF THE DRAWING

DESCRIPTION OF THE PREFERRED EMBODIMENT

Figure 1:
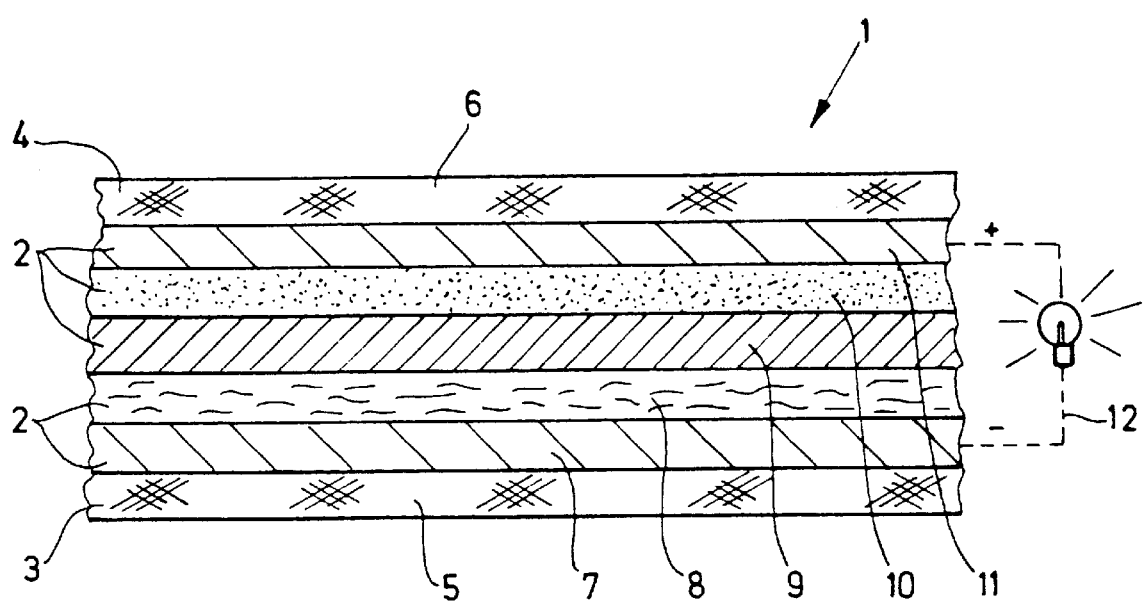
FIG. 1 is a diagrammatic cross-sectional view of a dye solar cell produced by the method according to the invention.

According to FIG. 1, the structure of a dye solar cell 1 is formed of a plurality of layers 2 disposed on a carrier substrate 3. A further carrier substrate 4 is disposed on the side of the layers 2 opposite the carrier substrate 3. The carrier substrate 3 is formed of a glass plate 5 or of a plate consisting of plastic material. Alternatively, a film of plastic material may be used. This applies as well to the carrier substrate 4, which is in the form of a glass plate 6 or a corresponding element (plate or film) of plastic material. The glass plates 5 and 6 allow light to penetrate into the interior of the dye solar cell 1 in order to generate electric current.

Applied to the glass plate 5 is an electrically conductive layer 7, which is conventionally in the form of a TCO layer. On the electrically conductive layer 7, there is a titanium dioxide layer 8 ($TiO_2$). Disposed on the titanium-dioxide layer 8 is a dye layer 9, which is followed by an electrolyte layer 10. Situated, in turn, on the electrolyte layer 10 is an electrically conductive layer 11, which is of a form identical with the layer 7. The electrically conductive layers 7 and 11 may be applied to the glass plates 5 and 6 either during the production of the dye solar cell 1 or they may have already been formed thereon during the production of the glass plates 5 and 6. The two layers 7 and 11 serve to collect free electrons; that is, they form charge collectors in order to surrender the electrons to an external circuit. The dye layer 9 is applied extremely thinly to the titanium-dioxide layer 8, which has a thickness of approximately 10 $\mu$m. The dye applied to the titanium-dioxide layer 8 absorbs incident light and supplies excited electrons to the layer 8. The transfer of energy to the titanium dioxide results in a positive charge in the dye. The free electrons are passed via the electrically conducting layer 7 to the external circuit identified by reference character 12. The equalization of charge carriers takes place through the intermediary of the electrolyte layer 10 (for example: iodide-iodine), which is connected to the electric circuit through the intermediary of the electrically conductive layer 11. Due to the structure of the titanium-dioxide layer 8, it has an effective surface for accepting the dye layer 9 which is considerably greater than the geometrical surface. This increases the efficiency of the dye solar cell 1.

Figure 2:
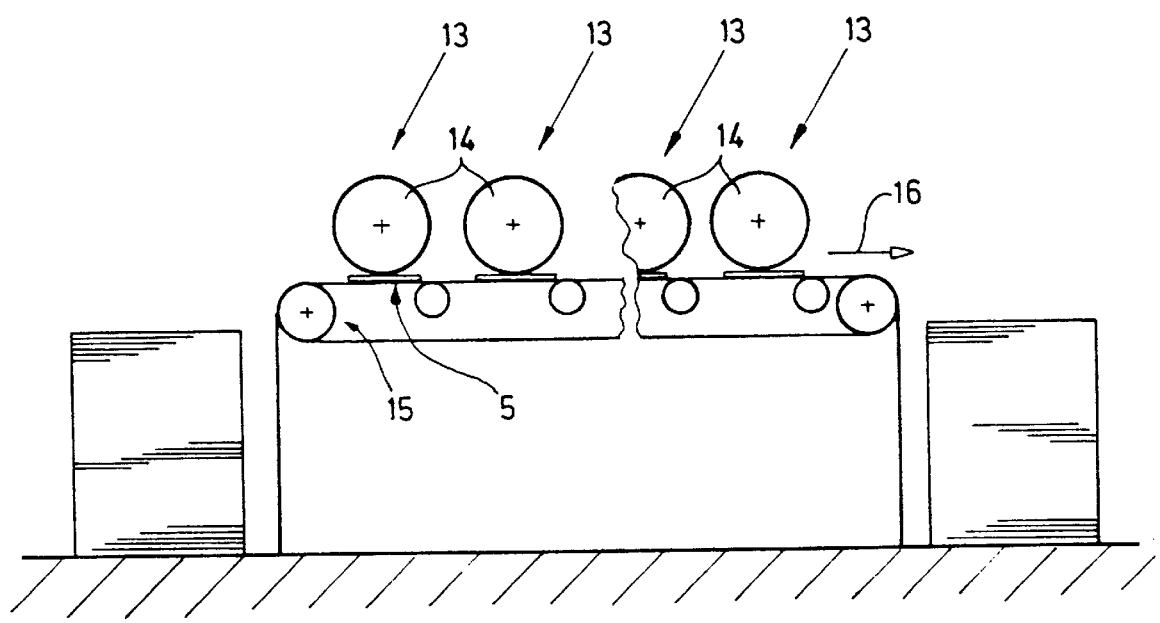
FIG. 2 is a diagrammatic side elevational view of equipment, namely a printing press, for performing the method of producing a dye solar cell.

According to the invention, at least the layers 8, 9 and 10 and, if desirable or necessary, also the layers 7 and 11 are applied by means of a plurality of successively performed printing operations. In this connection, FIG. 2 shows diagrammatically and schematically a printing press having a plurality of printing units 13, of which, in the interest of simplicity, only rollers 14 are represented which transfer the medium required for layer formation. Glass plates 5, which are formed with or without a TCO layer (electrically conductive layer 7), are moved in the direction of the arrow 16 by means of a transport device 15, and pass through the various printing units 13 in sequence. The transport device 15 which, by way of example in FIG. 2, is in the form of a revolving belt, ensures that the carrier substrate, i.e. the glass plate 5, and therefore also the layers superimposed on one another in the course of the printing process, is not subjected to impermissible bending, kinking, deformation or the like, so that the respective medium to be applied is transferred coherently and over the full area as well as without cracks and without damage. The performance of the printing operations and thus the application of the individual layers 8, 9, 10, on the one hand, and additionally 7 and 11, on the other hand, respectively, are performed in immediate succession as the carrier substrate passes through the various printing units, "in immediate succession" also including a non-illustrated solution wherein, for example, a thermal hardening device or the like is disposed between two printing units.

Figure 3:
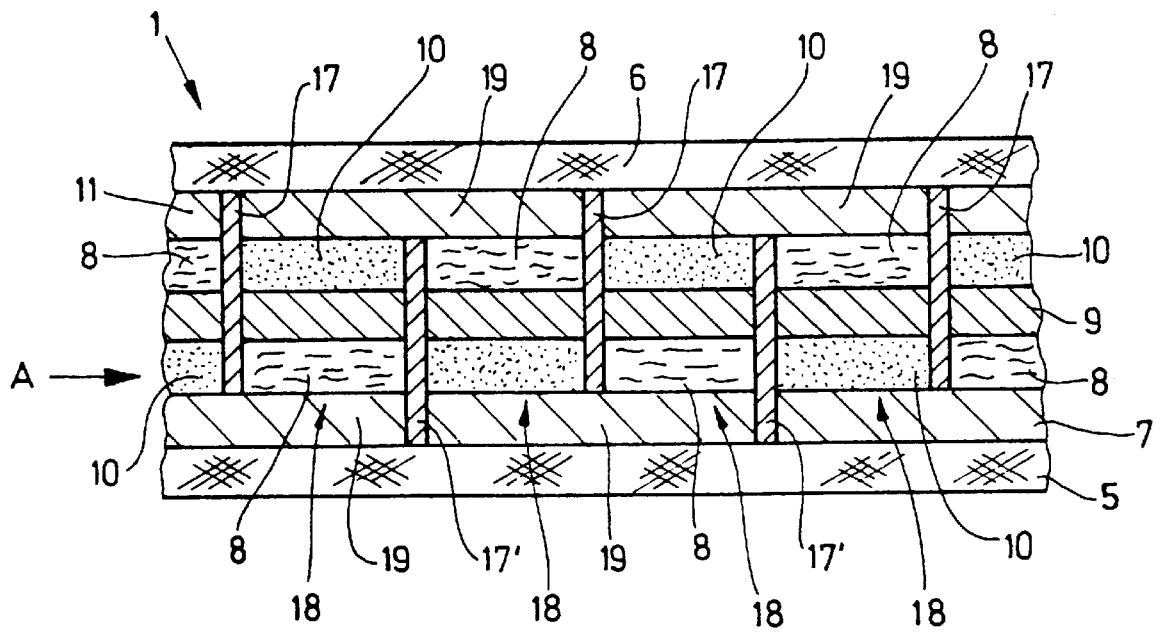
FIGS. 3 and 4 are diagrammatic cross-sectional views like that of FIG. 1 of other embodiments of a dye solar cell produced in accordance with the method of the invention.

The sequence of layers of the entire substrate, as is apparent from FIG. 1, may, in accordance with FIG. 3, be provided during production with insulating webs 17 and 17' for the separation of individual cells 18. The insulating webs 17 and 17' extend transversely, more particularly perpendicularly, to the planes of the layers. One insulating web 17' is disposed between every two insulating webs 17, the layer sequence in the region between the insulating web 17 and the adjacent insulating web 17' being different from that of the adjoining individual cell 18 in the region between the insulating web 17' and the following insulating web 17. This difference results from the fact that the titanium-dioxide layer 8 and the electrolyte layer 10 are interchanged. In this manner, the electrical polarity of adjoining individual cells 18 is reversed. The insulating webs 17 and 17' are arranged so that the webs form partition walls, with the result that the titanium-dioxide layer 8 in one layer level does not come into contact with the adjacent electrolyte layer 10 in the same layer level. In order to form the individual cells 18, however, the electrically conductive layers 7 and 11 as well as the dye layer 9 are also divided by the insulating webs 17 and 17'. In the case of the division of the electrically conductive layers 7 and 11, the procedure adopted in the embodiment of FIG. 3 is that the insulating web 17 starts from the glass plate 6 and extends as far as the electrically conductive layer 7, but does not divide the layer 7. Conversely, the insulating web 17' starts from the glass plate 5 and extends as far as the electrically conductive layer 11 without dividing the layer 11. This alternating division of the different layers results in the formation of conducting layers 19 from the electrically conductive layers 7 and 11, each conducting layer 19 connecting the positive or negative pole of one individual cell 18 to the opposite pole (i.e. the negative or positive pole) of an adjacent individual cell 18. This results, through a series connection, in the creation of electric modules.

It is essential that the insulating webs 17 and 17', respectively, be likewise also produced in the course of the printing process. The printing press is of such construction that, for example, in the production of layer level A (FIG. 3), viewed from the left-hand to the right-hand side of the figure, the printing press initially applies the electrolyte layer 10 in this level and then, as viewed in the printing direction, applies a material for the formation of the insulating web 17 (i.e. of a part thereof). There then follows the application of the titanium-dioxide layer 8, which is then again followed by a section of a layer for the formation of the insulating web 17', and so forth. In the interest of simplicity, the individual sections of which the entire length of the insulating webs 17 and 17' are composed are not shown as being subdivided, because they form a homogeneous unit as they are printed one on top of the other.

Figure 4:
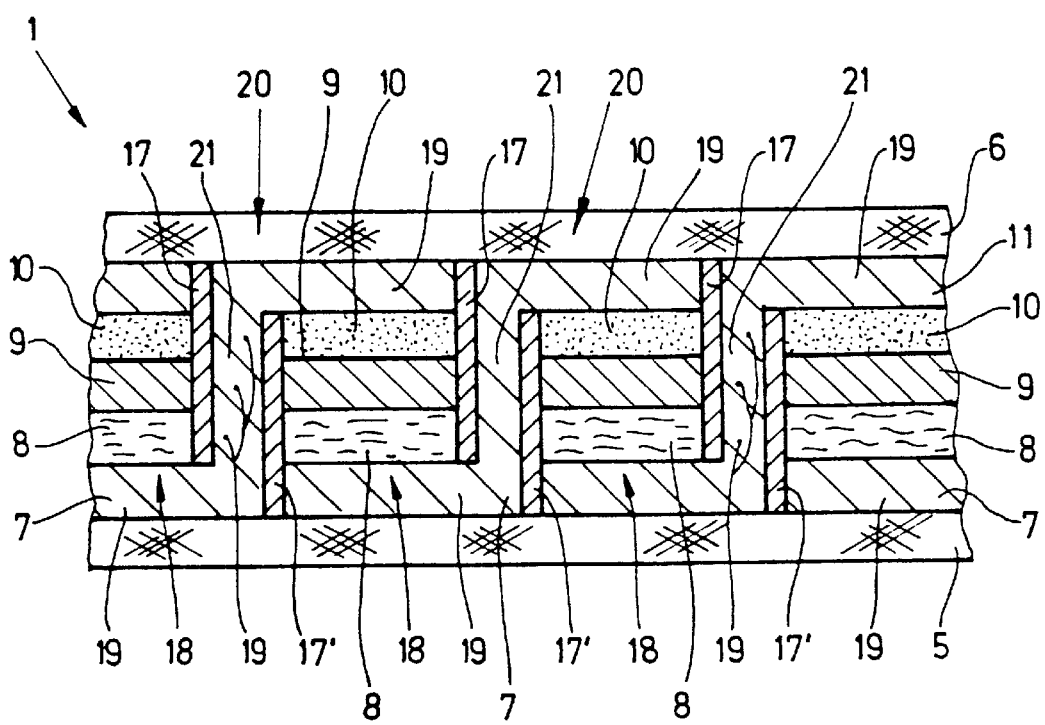

In the embodiment shown in FIG. 4, the individual layers are applied, just as is described hereinbefore, by means of a printing process with a printing press. In this case, however, the layer sequence of adjacent individual cells 18 is always identical, with the result that, in order to obtain a series connection of the individual cells 18, it is necessary to make a polarity-reversal connection 20. The polarity-reversal connection 20 is achieved by providing that the electrically conductive layer 7 of an individual cell 18 be electrically connected to the electrically conductive layer 11 of the adjacent individual cell 18 by means of a conducting web 21. Each conducting web 21 extends between two insulating webs 17 and 17', respectively, which form therebetween an accommodation space for the conducting web 21.

At the end of the printing process, when all layers have been applied, the dye solar cell 1 and the entire substrate, respectively, are enclosed by means of the aforementioned glass plate 6.

We claim:

1. Method for producing a photochemical cell having at least one carrier substrate and a plurality of layers disposed thereon, which comprises performing a plurality of successive printing operations for applying the layers.

2. Method according to claim 1, which includes performing the printing operations while respectively forming a full-surface, coherent layer in the manner of an offset print.

3. Method according to claim 1, which includes performing the printing operations in direct succession.

4. Method according to claim 1, which includes applying each layer by a separate printing unit of a printing press.

5. Method according to claim 1, which includes separating at least some of the layers by means of insulating webs into sections of individual cells.

6. Method according to claim 5, which includes forming the insulating webs by printing.

7. Method according to claim 5, which includes applying a plurality of insulating-web layers for forming an insulating web bridging a plurality of the layers.

8. Method according to claim 5, which includes forming conductive webs composed of conductive layers between the insulating webs.

9. Method according to claim 1, which includes guiding the carrier substrate along a plane during the printing operation.

10. Method according to claim 1, which includes supporting the carrier substrate on a plane during the printing operation.

11. Method according to claim 1, which includes printing the layers on the carrier substrate with a viscous medium.

12. Method according to claim 1, which includes printing conductive layers on the carrier substrate for conducting electric current.

13. Method according to claim 1, wherein the cell being produced is a dye solar cell.

14. Method for operating a printing press with a plurality of printing units for producing a photochemical cell, which comprises printing successively with the plurality of printing units successive layers on a carrier substrate.

15. Method according to claim 14, wherein the printing press being operated is an offset printing press.

* * * * *